Feb. 19, 1974 — C. C. CHAPMAN — 3,793,264
PURIFICATION OF HF CATALYST IN ALKYLATION PROCESS
Filed Dec. 1, 1971 — 2 Sheets-Sheet 2

INVENTOR.
C.C. CHAPMAN
BY Young + Quigg
ATTORNEYS

United States Patent Office 3,793,264
Patented Feb. 19, 1974

3,793,264
PURIFICATION OF HF CATALYST IN
ALKYLATION PROCESS
Charles C. Chapman, Bartlesville, Okla., assignor to
Phillips Petroleum Company
Filed Dec. 1, 1971, Ser. No. 203,768
Int. Cl. C07c 3/54
U.S. Cl. 260—683.48        3 Claims

ABSTRACT OF THE DISCLOSURE

Olefins and isoparaffins are alkylated in the presence of an HF catalyst. The reactor effluent is passed to a settling zone. The hydrocarbon phase is fractionated to recover an alkylate product. The acid phase is recycled to the reactor. A portion of the recycled acid is passed to a purification column for removal of acid soluble oil. Stripping vapor is introduced into the purification column both above and below the surface of said soluble oil accumulated therein. Baffles are positioned in the lower region of the column to increase the vapor-liquid contacting.

---

It is common practice in the petroleum industry to produce high octane motor fuel by alkylating olefins with isoparaffins in the presence of a hydrogen fluoride (HF) catalyst. The effluent from the alkylation reactor is usually passed to a settling vessel wherein a hydrocarbon phase is separated from an acid phase. The hydrocarbon phase is fractionated to separate low boiling hydrocarbons from the alkylate product. The acid phase is recycled to the reactor. However, it is necessary to purify a portion of the recycled acid in order to prevent a buildup of acid soluble oil (ASO) in the system. This purification is usually accomplished by passing an HF-containing stream from the stiler to a purification column wherein HF is stripped from the ASO by means of a vaporous hydrocarbon such as isobutane. While the HF purification systems employed heretofore have generally been effective to produce an acid stream having the required purity, the ASO stream from the purification unit often has contained undesirable amounts of HF. This has required subsequent purification steps to remove the HF before the ASO is recycled to the refinery or passed to a disposal unit.

In accordance with one embodiment of this invention, a method is provided for operating an HF purification unit so as to produce an HF containing stream of low ASO content and to produce an ASO stream of low HF content. This is accomplished by introducing a first portion of the stripping hydrocarbon into the purification unit at a region below vapor-liquid contacting means positioned within the unit. This vapor passes upwardly to strip HF from liquid descending through the unit. A second portion of the stripping hydrocarbon is sparged into the lower region of accumulated liquid to provide additional stripping of HF from the ASO. Baffles are provided in the lower region of the purification unit so that the descending liquid flows in a serpentine path before being removed from the bottom of the unit. The second portion of vapor is introduced into this path so as to provide efficient stripping of the HF before the liquid is finally removed. In accordance with one embodiment of this invention, contacting apparatus is provided which can readily be inserted into a tank to convert the tank into an efficient purification unit.

Figure 1:
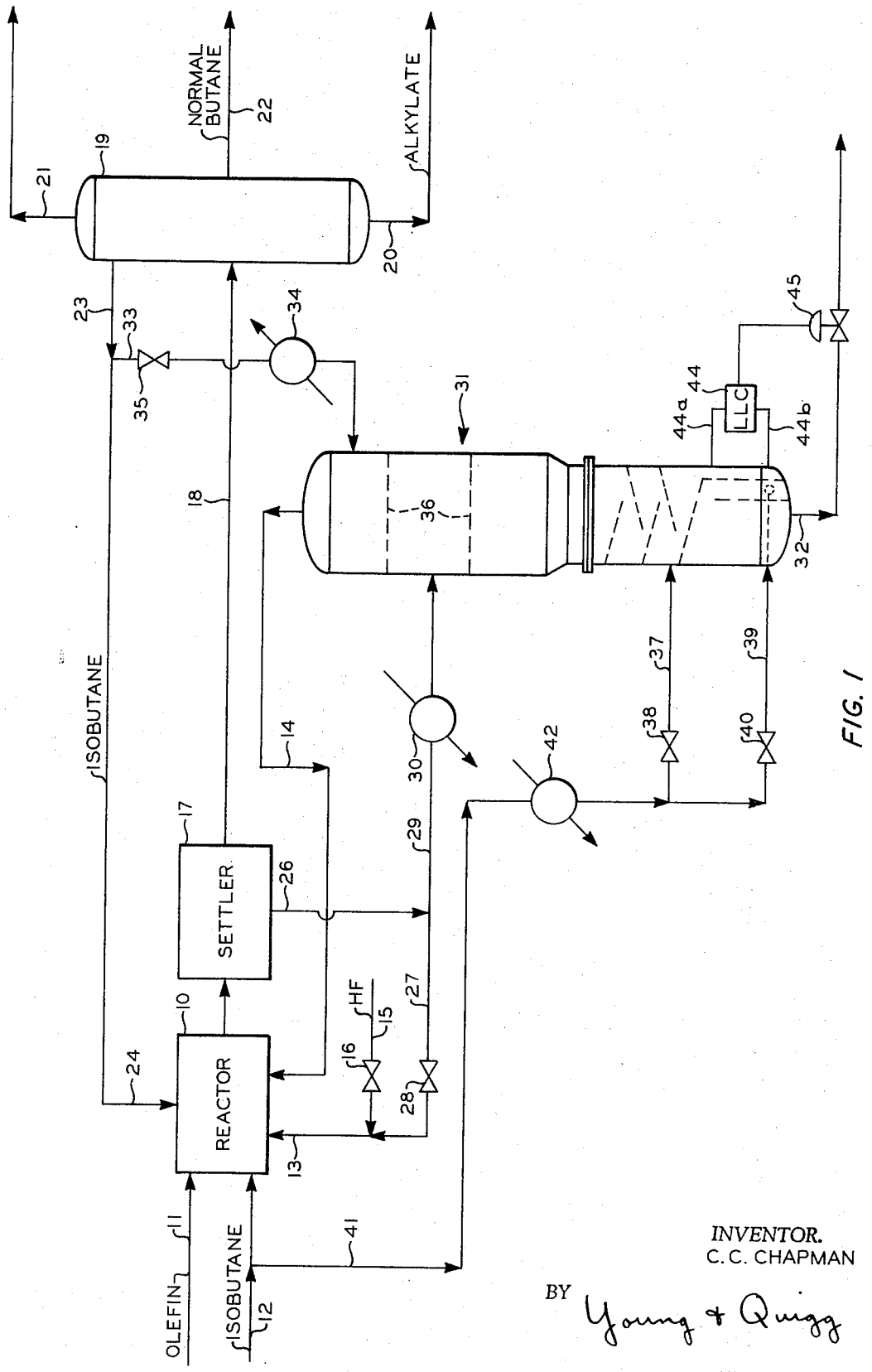
Figures 2, 3, 4:
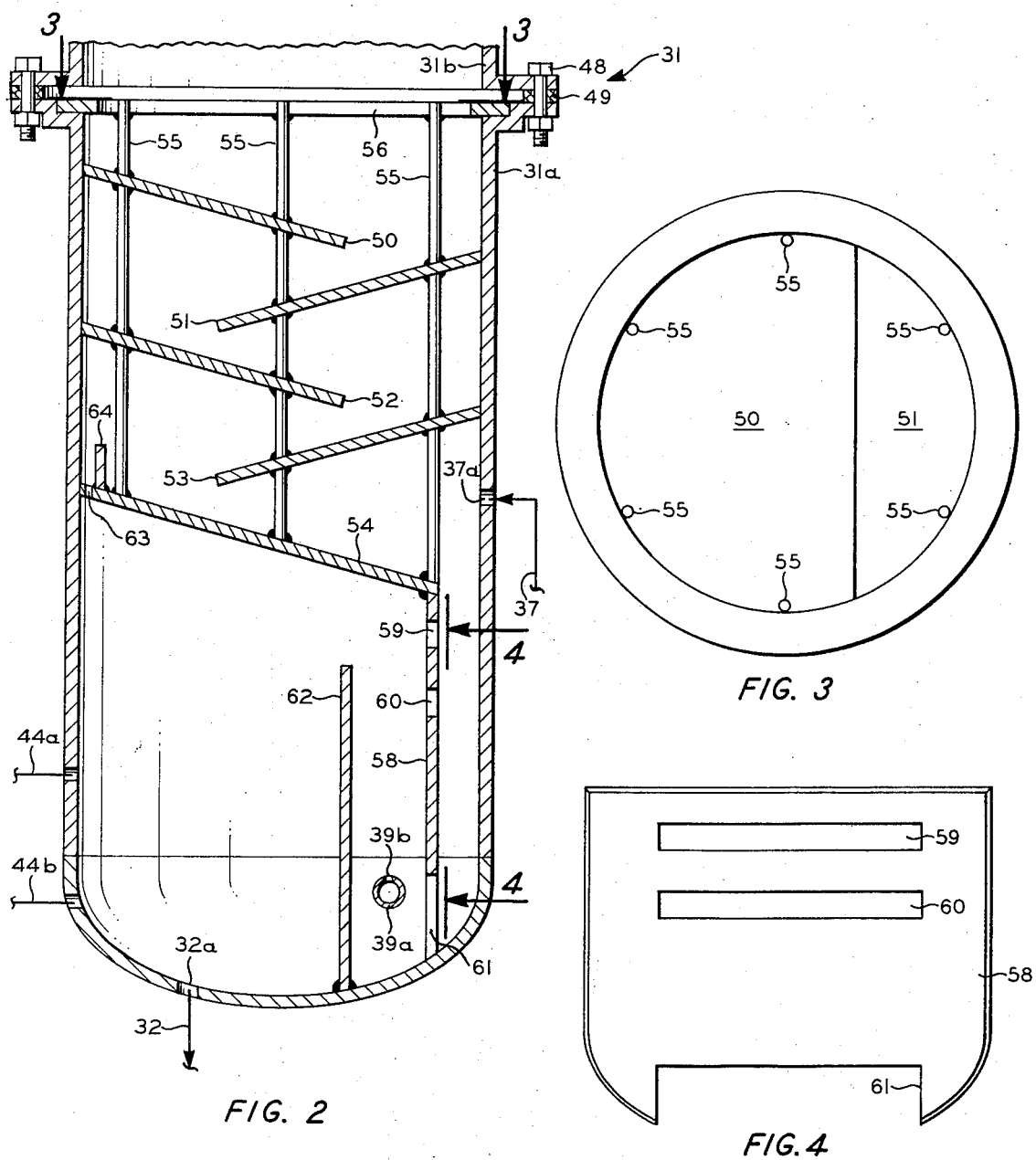

In the accompanying drawing, FIG. 1 is a schematic representation of an HF alkylation process employing a purification unit of this invention. FIG. 2 is a cross-sectional view of the lower portion of the purification unit of FIG. 1. FIG. 3 is a view taken along line 3—3 in FIG. 2. FIG. 4 is a view taken along line 4—4 in FIG. 2.

Referring now to the drawing in detail and to FIG. 1 in particular, there is shown an alkylation reactor 10. An olefin feed stream is introduced through a conduit 11 and an isoparaffin feed stream is introduced through a conduit 12. The olefin feed generally comprises one or more olefins having from 2 to 5 carbon atoms, while the isoparaffin stream generally comprises isobutane and/or isopentane. In a typical operation, the olefin feed comprises a mixture of propylene and butylenes, while the isoparaffin feed comprises primarily isobutane. A catalyst comprising hydrogen fluoride is introduced into reactor 10 through conduits 13 and 14 from sources to be described. In a typical operation, the HF is in the liquid phase and has a purity of about 90%. Fresh makeup catalyst can be introduced as required through a conduit 15 which has a valve 16 therein. The effluent from reactor 10 is passed to a settler 17 in which a phase separation is made between the acid and hydrocarbons. The hydrocarbon phase is removed through a conduit 18 and passed to a fractionator 19. The fractionator is operated to produce a bottoms alkylate product stream which is removed through a conduit 20, an overhead propane stream which is removed through a conduit 21, a normal butane stream which is removed through a side conduit 22, and an isobutane stream which is removed through a side conduit 23. The isobutane is recycled to reactor 10 through a conduit 24.

The acid phase is removed from settler 17 through a conduit 26. A portion of this stream is recycled to conduit 13 through a conduit 27 which has a valve 28 therein. The remainder of the HF is passed through a conduit 29, which has a heat exchanger 30 therein, to an acid purification column 31. Heat exchanger 30 elevates the temperature of the feed to a level to flash at least a substantial portion of the HF as it enters column 31. A purified HF-containing stream is removed from the top of column 31 through conduit 14 and recycled to reactor 10. An ASO stream is removed from the bottom of column 31 through a conduit 32.

An isobutane reflux stream is introduced into the top of column 31. This isobutane can be obtained by passing a portion of the isobutane flowing through conduit 23 through a conduit 33, which has a cooler 34 and a valve 35 therein. As an alternative, some or all of the reflux isobutane can be obtained from feed stream 12. Column 31 is provided with contacting trays 36 in the upper region thereof, as illustrated. As an alternative, a basket which is filled with packing material, such as Raschig rings, can be disposed in the upper region of column 31 to provide contact between the rising vapor in the column and the reflux liquid.

HF is stripped from the ASO in column 31 by means of vaporous hydrocarbons which are introduced into the lower region of the column. The lower region of column 31 is provided with a plurality of contacting trays and baffles of a configuration to be described hereinafter. A first stream of vaporous isobutane is introduced into column 31 by means of a conduit 37 which has a valve 38 therein. A second stream of vaporous isobutane is introduced through a conduit 39 which has a valve 40 therein. A conduit 41, which has a heater 42 therein, extends between feed conduit 12 and conduits 37 and 39.

The flow of ASO from the bottom of column 31 is regulated by a liquid level controller 44 which adjusts a valve 45 in conduit 32. Controller 44 is connected to column 31 by conduits 44a and 44b which are disposed above and below the normal liquid level in the column.

The lower section of column 31 is illustrated in detail in FIGS. 2, 3 and 4. As shown in FIG. 2, column 31 comprises two sections 31a and 31b which are provided with connecting flanges. The flanges are secured together by means of bolts 48, with a sealing gasket 49 being disposed therebetween. A plurality of slanting trays 50 to 54 are positioned in the lower region of column 31 so that liquid descending through the column flows down the trays in series. In the illustrated embodiment of this invention, trays 50 to 54 are secured to a plurality of support rods 55 which are attached at their upper ends to a support ring 56. Ring 56 rests on the upper flange of column section 31a. A baffle plate 58 is secured to the lower edge of plate 54 and depends therefrom to rest on the bottom of column section 31. Plate 58 is provided with slots 59 and 60 in the upper portion and with a slot 61 in the lower portion, as shown in detail in FIG. 4. The plate assembly thus far described can be assembled outside the column and then inserted into the column as a unit. As an alternative, the individual plates can be welded directly to the column walls.

A second vertical baffle plate 62 is secured to column section 31a in spaced relationship with plate 58. If desired, this plate can be suspended from plate 54. A conduit 39a, which has a plurality of openings 39b in the top thereof, is disposed in the lower region of the vessel to provide a sparger which distributes the vapor introduced through conduit 39.

The ASO which enters column 31 flows downwardly in a serpentine path along plates 50 to 54 and into the region between plate 58 and the wall of the column. The flow continues through opening 61 and upwardly through the region between plates 58 and 62. The liquid then flows over the top of plate 62 and is accumulated in the lower region of the column before being withdrawn through conduit 32. A portion of the liquid flows through slot 60 back into the region between plate 58 and the vessel wall and is thus recirculated. A certain portion of the vapor introduced through conduit 39 escapes upwardly through slot 59, and the remainder passes upwardly through a series of openings 63 in plate 54. A vertically extending plate 64 can be formed on plate 54 to prevent liquid from flowing downwardly through opening 63. A minor amount of liquid also flows through openings 59 and 60. The ascending vapors serve to strip HF from the ASO so that an ASO stream having minimum HF content is removed through conduit 32.

In a typical example of this invention, column 31 is employed to purify an acid stream obtained from the settler of an HF alkylation reaction in which a mixture of propylene and butylenes is alkylated with isobutane. The upper section of column 31 is about twelve feet long and has a diameter of about five feet. The lower section is about twelve feet long and has a diameter of about two feet. Acid from settler 17 is introduced into column 31 at a rate of about 240 barrels per day and at a temperature of about 285° F. Isobutane at a temperature of about 70° F. is introduced through conduit 33 at a rate of about 72 barrels per day. Vaporous isobutane at a temperature of about 330° F. is introduced through conduit 37 at a rate of about 204 barrels per day (based on liquid volume) and through conduit 39 at a rate of about 204 barrels per day (based on liquid volume). ASO at a temperature of about 318° F. is removed through conduit 32 at a rate of about 13.3 barrels per day. This ASO contains about six pounds of HF per day, with a water content of about 0.4 weight percent. Column 31 is operated at a pressure of about 100 p.s.i.g.

The flow rates of stripping vapor introduced through conduits 37 and 39 can be adjusted from time to time by manipulation of respective valves 38 and 40. Normally, a maximum amount of stripping vapor is employed to minimize the HF content of the ASO bottoms stream. However, a practical limit is imposed by the ASO content of the stream recycled through conduit 14. The introduction of hot stripping vapor directly into the liquid in the bottom of column 31 tends to break down organic fluorides. This is a desirable result because it permits greater recovery of HF. If desired, all or substantially all of the stripping vapor can be introduced through conduit 39. This provides a maximum amount of vapor-liquid contact.

In a typical operation conducted prior to this invention, the same quantity of acid is treated in column 31. However, the feed and bottom temperatures are 265° F. and 260° F., respectively. The flows of stripping and reflux isobutane are each 96 barrels per day. All of this stripping vapor is introduced above the liquid level in column 31. Other operating conditions are the same as described above. In this prior operation, ASO is removed through conduit 32 at a rate of about 29 barrels per day. This ASO contains about 1910 pounds of HF and about 5 weight percent water. Thus, operating in accordance with this invention permits the HF content of the ASO stream to be reduced from about 1910 pounds per day to about 6 pounds per day. This greatly simplifies the disposal problem of the ASO, and permits recovery of a substantial amount of additional HF catalyst.

The baffle arrangement in the bottom of vessel 31 increases the liquid flow path and assists in the removal of HF from the ASO, particularly as the ASO flows over the top of baffle 62 and reverses direction.

While this invention has been described in conjunction with presently preferred embodiments, it obviously is not limited thereto.

What is claimed is:

1. In an alkylation process employing an HF catalyst, in which effluent from the reaction zone is passed to a settling zone to separate an acid stream containing HF and acid soluble oil, the improvement of purifying said stream which comprises:
    introducing said stream into a vertically-extending separation zone at an intermediate region thereof located between the top and bottom of the separation zone, at a temperature sufficiently high to vaporize HF as said stream enters said intermediate region;
    introducing a liquid hydrocarbon as reflux into an upper region of said separation zone located above said intermediate region;
    passing said acid soluble oil downwardly in said separation zone from said intermediate region to a lateral region located in said separation zone near the bottom thereof, said acid soluble oil passing from the lower end of said lateral region upwardly into an acid-stripping zone adjacent said lateral region, said acid soluble oil passing from the top of said acid stripping zone downwardly to the bottom of said separation zone;
    withdrawing an acid soluble oil stream from the bottom of said separation zone at a rate such that an accumulation of acid soluble oil remains therein;
    introducing a vaporous hydrocarbon stream into said acid stripping zone so that the vaporous hydrocarbon rises in said zone in contact with the upwardly flowing acid soluble oil and thereby strips HF from the acid soluble oil; and
    removing a vaporous hydrocarbon stream containing purified HF from the top of said separation zone.

2. The method of claim 1, further comprising introducing a stream of additional vaporous hydrocarbon into said separation zone at a location above the accumulated acid soluble oil but below said intermediate region so that said additional vaporous hydrocarbon contacts acid soluble oil descending from said first region.

3. The method of claim 1 wherein a portion of the liquid acid soluble oil which is passed upwardly in said acid stripping zone is recycled within said separation zone by mixing with the acid soluble oil which is passed downwardly in said lateral region.

References Cited

UNITED STATES PATENTS

| | | | |
|---|---|---|---|
| 2,914,590 | 11/1959 | Van Pool | 260—683.48 |
| 3,478,125 | 11/1969 | Chapman | 260—683.48 |
| 3,410,759 | 11/1968 | Fontenot et al. | 260—683.48 |
| 3,171,865 | 3/1965 | Davison et al. | 260—683.48 |
| 3,594,444 | 7/1971 | Jones | 260—683.48 |

DELBERT E. GANTZ, Primary Examiner

G. J. CRASANAKIS, Assistant Examiner